US012174426B2

(12) United States Patent
Withers et al.

(10) Patent No.: US 12,174,426 B2
(45) Date of Patent: Dec. 24, 2024

(54) RING-GEOMETRY PHOTODETECTOR DESIGNS FOR HIGH-SENSITIVITY AND HIGH-SPEED DETECTION OF OPTICAL SIGNALS FOR FIBER OPTIC AND INTEGRATED OPTOELECTRONIC DEVICES

(71) Applicant: UNM Rainforest Innovations, Albuquerque, NM (US)

(72) Inventors: Nathan Jack Withers, Albuquerque, NM (US); Marek Osinski, Albuquerque, NM (US)

(73) Assignee: UNM Rainforest Innovations, Albuquerque, NM (US)

( * ) Notice: Subject to any disclaimer, the term of this patent is extended or adjusted under 35 U.S.C. 154(b) by 0 days.

(21) Appl. No.: 18/472,183

(22) Filed: Sep. 21, 2023

(65) Prior Publication Data

US 2024/0012201 A1    Jan. 11, 2024

Related U.S. Application Data

(63) Continuation of application No. 17/558,468, filed on Dec. 21, 2021, now abandoned.

(60) Provisional application No. 63/128,608, filed on Dec. 21, 2020.

(51) Int. Cl.
| | | |
|---|---|---|
| G02B 6/122 | (2006.01) | |
| G02B 6/125 | (2006.01) | |
| G02B 6/24 | (2006.01) | |
| G02B 6/26 | (2006.01) | |
| G02B 6/12 | (2006.01) | |
| G02B 6/293 | (2006.01) | |

(52) U.S. Cl.
CPC .......... *G02B 6/243* (2013.01); *G02B 6/1225* (2013.01); *G02B 6/125* (2013.01); *G02B 6/266* (2013.01); *G02B 6/12007* (2013.01); *G02B 2006/12097* (2013.01); *G02B 2006/12104* (2013.01); *G02B 2006/12119* (2013.01); *G02B 2006/12126* (2013.01); *G02B 2006/1213* (2013.01); *G02B 6/29338* (2013.01)

(58) Field of Classification Search
CPC .. G02B 6/12007; G02B 6/1225; G02B 6/125; G02B 6/243; G02B 6/266; G02B 6/29338; G02B 2006/12097; G02B 2006/12104; G02B 2006/12119; G02B 2006/12126; G02B 2006/1213
See application file for complete search history.

(56) References Cited

U.S. PATENT DOCUMENTS

| | | |
|---|---|---|
| 6,937,342 B2 | 8/2005 | Osinski et al. |
| 6,978,067 B2 | 12/2005 | Herbert et al. |
| 11,353,654 B2 * | 6/2022 | Bian ...................... G02B 6/124 |

OTHER PUBLICATIONS

S. O. Kasap. Optoelectronics and Photonics: Principles and Practices, Pearson Education Inc., New Jersey, pp. 377-383, 2013.
(Continued)

*Primary Examiner* — Ryan A Lepisto
(74) *Attorney, Agent, or Firm* — Keith Vogt, Ltd.; Keith A. Vogt

(57) ABSTRACT

A semiconductor photodetector comprising a closed loop configured to receive light from an external source adapted to trap light within said closed loop until absorption by the semiconductor.

8 Claims, 1 Drawing Sheet

(56) References Cited

OTHER PUBLICATIONS

K. Kato, "Ultrawide-band/high-frequency photodetectors", IEEE Trans. Microw Theory 47 (#7), pp. 1265-1281, 1999.
K. J. Williams, R. D. Esman, and M. Dagenais. "Nonlinearities in p-i-n microwave photodetectors", J. Lightwave Technol. 14 (#1), pp. 84-96, 1996.
Mickael Guillaumee et al. "Scattering of light by a sub-monolayer of randomly packed dielectric microspheres giving color effects in transmission," Proc. SPIE 6988, Nanophotonics II, 698811 (Apr. 23, 2008) (Year: 2008).
Jackson et al. "Silver Nanoshells: Variations in Morphologies and Optical Properties," J Phys Chem B, vol. 105, p. 2743-2746, 2001 (Year: 2001).
Galisteo-Lopez et al. "Self-Assembled Photonic Structures," Adv. Mater., vol. 23, p. 30-69, 2011 (Year: 2011).

\* cited by examiner

RING-GEOMETRY PHOTODETECTOR DESIGNS FOR HIGH-SENSITIVITY AND HIGH-SPEED DETECTION OF OPTICAL SIGNALS FOR FIBER OPTIC AND INTEGRATED OPTOELECTRONIC DEVICES

RELATED APPLICATIONS

This application is a continuation of U.S. Ser. No. 17/558,468 filed on Dec. 21, 2021, which claims priority to U.S. Provisional Application No. 63/128,608, filed on Dec. 21, 2020, both of which are incorporated herein in their entirety.

STATEMENT REGARDING FEDERALLY SPONSORED RESEARCH & DEVELOPMENT

This invention was made with government support by the Office of Naval Research under Grant No. N00014-17-1-2416. The government has certain rights in the invention.

INCORPORATION BY REFERENCE OF MATERIAL SUBMITTED ON A COMPACT DISC

Not applicable.

FIELD OF THE INVENTION

This invention pertains to the field of photodetectors. More particularly, the invention pertains to novel designs for high-sensitivity, high-speed photodetectors.

BACKGROUND OF THE INVENTION

In many applications, including optical telecommunications, an important component of the system is the photodetector, which converts an optical signal to an electrical signal. To provide a fast and sensitive photodetector, there are several parameters that need to be optimized. Junction capacitance and photocarrier drift time need to be minimized for fast response, while absorbance needs to be maximized for high sensitivity. To achieve these two competing goals, photodiode design compromises are made in current designs.

A typical photodetector is comprised of a junction of p-type and n-type semiconductors, where the free electrons and empty electron states (holes) combine and create a depletion zone of high electrical field. Photons absorbed in this zone generate free electrons and holes, which are moved apart rapidly in the electrical field. Once the electrons and holes leave the depletion zone, a current is detected. Photocarrier drift time describes how long the generated holes (electrons move faster and are not the limiting factor) take to leave the depletion zone. This time can be calculated with the formula of $t_h = w/v_h$, where W is the width of the depletion zone and $v_h$ is the hole velocity [Kasap 2013].

Charged dopants in the depletion zone create a high electrical field. The junction capacitance $C_{dep}$ is given by the formula $$C_{dep} = \frac{\varepsilon_0 \varepsilon_r A}{W},$$

where A is the area of the photodetector and $\varepsilon_0 \varepsilon_r$ is the electrical permittivity of the material used. Finally, since photons need to be absorbed in the depletion zone, the absorbance is governed by the equation $I(x) = I_0 \exp(-\alpha x)$, where $I_0$ is the incoming light intensity, $\alpha$ is the absorption coefficient that is dependent on material and wavelength, and x is the distance into the material.

Taken together, a very fast photodetector must have a very thin active region (small width of the depletion zone) to minimize drift times. The thin active region also needs to occupy a very small area to minimize the capacitance of the junction, which is the other primary limiting factor on how rapidly the signal can be generated by the photodetector. This extremely small and thin photodetector cannot absorb much of the light impinging on it perpendicular to the p-n junction plane. Most of the incident light will pass through, reducing the detection efficiency. By the same token, a very sensitive photodetector requires either a thick depletion zone, which will extend the time for carriers to exit the depletion zone, or a thin depletion zone that is very large, where the capacitance of the junction will limit the speed of detectable signal.

An alternative design is a long, thin photodetector, with a small junction area, called a waveguide photodetector (WGPD). Light in this case is impinging along the waveguide axis, in the p-n junction plane. WGPDs can be used to mitigate the problems described above. A bandwidth of over 100 GHz and a quantum efficiency of 50% have been realized [Kato 1999]. Even with these extremely fast photodetectors, there are also issues with nonlinear absorption of the light down the length of the photodetector that put limits on dynamic range and degrade performance in digital communication [Williams 1996].

BRIEF SUMMARY OF THE INVENTION

In one embodiment, the present invention provides a semiconductor photodetector comprising a closed loop configured to receive light from an external source adapted to trap light within said closed loop until absorption by the semiconductor.

In other embodiments, the present invention provides semiconductor photodetector comprising a closed loop configured to receive light from an external source to trap light within the closed loop and recirculate the light until absorption by the semiconductor.

In other embodiments, the present invention provides semiconductor photodetector wherein the closed loop recirculates light received from an external source until all light is absorbed by the semiconductor.

In other embodiments, the present invention provides semiconductor photodetector wherein the closed loop is a ring.

In other embodiments, the present invention provides semiconductor photodetector wherein light is captured and re-circulated in the photodetector using a curved ridge-waveguide ring resonator.

In other embodiments, the present invention provides semiconductor photodetector wherein light is captured and re-circulated in the photodetector using straight waveguides and mirrors.

In other embodiments, the present invention provides semiconductor photodetector wherein light is captured and re-circulated in the photodetector using straight waveguides and mirrors that redirect light into the closed loop.

In other embodiments, the present invention provides semiconductor photodetector wherein light is captured and re-circulated in the photodetector using a photonic crystal structure.

In other embodiments, the present invention provides a method capturing light in a semiconductor photodetector comprising the following steps: directing light into a closed loop; and trapping light from an external source within said closed loop and recirculating light in the closed loop until absorption by the semiconductor.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

As described above, there are fundamental limits in the physics of photodetectors that have forced trade-offs of either sensitivity or frequency response with current photodetector designs. In one aspect, the embodiments of the present invention concern designs that avoid these trade-offs by providing a compact, efficient and high-bandwidth ring photodetector. Preferred embodiments include three related photodetector designs using the total internal reflection waveguiding in FIG. 1a, the mirror reflection in FIG. 1b, or the photonic crystal guiding in FIG. 1c.

Figure 1A:
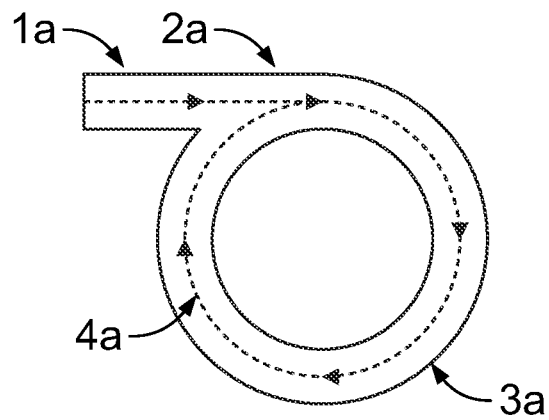
FIG. 1A shows a waveguide bending photodetector design for an embodiment of the present invention.
Figure 1B:
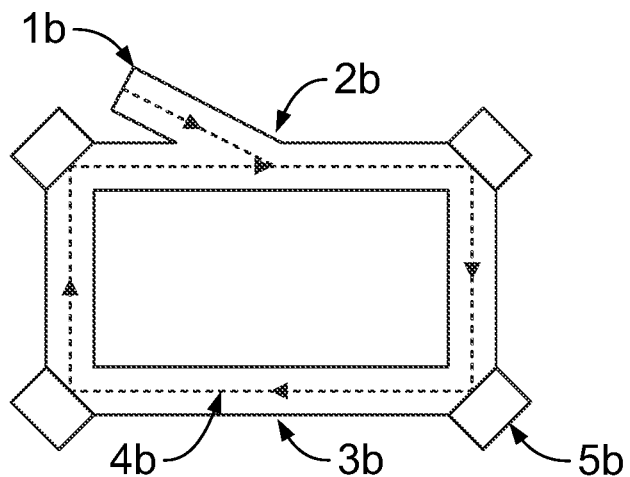
FIG. 1B shows a total internal reflection mirrors photodetector design for an embodiment of the present invention.
Figure 1C:
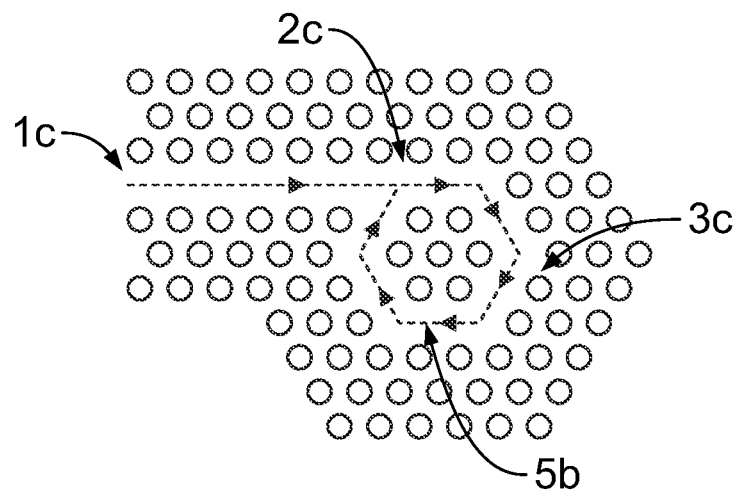
FIG. 1C shows a photonic crystal design for an embodiment of the present invention.

A common feature of the embodiments of the present invention is the entry point for light of that may be a whistle-geometry ring photodetector (WRP). A ridge waveguide 1a, 1b, as shown in FIGS. 1a and 1b, or a photonic crystal guiding structure 1c, as shown in FIG. 1c, collects light, either from an optical fiber, lens, or other part of a larger integrated optoelectronic device and guides it to the ring photodetector. The light is guided to a non-symmetrical Y-junction, which is shown in FIGS. 1a-1c as parts 2a, 2b and 2c, injecting the light into the absorptive part of the photodetector. The Y-junction allows the light to enter the unidirectional sections 3a, 3b and 3c which define a continuous path or ring such as a circle, rectangle, hexagonal as well as other designs such as oval, elliptical, and others, of the photodetector, where it can circulate until it is fully absorbed. The path of the light is shown as 4a, 4b, and 4c for the three embodiments shown in FIGS. 1a-1c. While the design in FIG. 1a re-circulates light by bending the waveguide, FIG. 1b uses strategically placed plurality of mirrors, labeled as 513, to induce mirror reflection for keeping the light recirculating.

With the ring or continuous path designs of FIG. 1a-c, the absorptive depletion zone area may be engineered to be very thin in order to minimize drift time, and even though the absorption per unit length is low, the re-circulation of the light within the ring or continuous path means that all of the light will eventually be absorbed. The ring or continuous path can be made extremely small (1 µm in diameter or less), minimizing the area of the diode junction, which minimizes both the capacitance and the physical footprint for an integrated optoelectronic device for very large-scale integration (VLSI), where footprint size of devices is a limiting factor.

In other embodiments, unidirectional sections 3a, 3b and 3c define a ring or continuous path 4a-4c which are of a length that causes the light to re-circulate multiple times while the light is absorbed. These embodiments provide much more even illumination for the photodetector, minimizing optical nonlinear effects caused by the extremely small sizes used in the embodiments of the present invention.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiments, methods, and examples, but by all embodiments and methods within the scope and spirit of the disclosure.

What is claimed is:

1. A photodetector comprising: a semiconductor having a closed loop, said closed loop configured to receive light from an external source; and said closed loop adapted to trap said light from said external source within said closed loop until it is absorbed by the semiconductor, and wherein said closed loop is formed as a waveguide defect in a photonic crystal structure, said photonic crystal structure comprised of periodically arranged holes or rods such that the incident light from said external source is confined to a photonic crystal waveguide core.

2. The semiconductor photodetector of claim 1 wherein said closed loop recirculates light received from an external source.

3. The semiconductor photodetector of claim 1 wherein said closed loop recirculates light received from an external source until all light is absorbed by the semiconductor.

4. The semiconductor photodetector of claim 1 wherein said closed loop is a ring.

5. A method of capturing light in a semiconductor photodetector comprising the following steps: directing light from an external source into a closed loop of a semiconductor; and trapping said light from an external source within said closed loop until it is absorbed by the semiconductor, and wherein light is captured in the photodetector using a photonic crystal structure, with said photonic crystal designed such that said light from an external source has a spectral width contained within a the photonic bandgap.

6. The method of claim 5 further comprising the step of recirculating light received from an external source in said closed loop until absorption by the semiconductor.

7. The method of claim 6 wherein said light is recirculated until all light from an external source is absorbed by the semiconductor.

8. The method of claim 6 wherein said closed loop is a ring.

* * * * *